(12) United States Patent
Chen et al.

(10) Patent No.: US 7,590,554 B2
(45) Date of Patent: Sep. 15, 2009

(54) SYSTEM AND METHOD FOR FORECASTING UNCERTAIN EVENTS WITH ADJUSTMENTS FOR PARTICIPANTS CHARACTERISTICS

(75) Inventors: Kay-Yut Chen, Santa Clara, CA (US); Leslie R. Fine, Menlo Park, CA (US); Bernardo A. Huberman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1649 days.

(21) Appl. No.: 09/976,959

(22) Filed: Oct. 11, 2001

(65) Prior Publication Data

US 2003/0078829 A1   Apr. 24, 2003

(51) Int. Cl.
*G06F 17/30* (2006.01)
(52) U.S. Cl. ...................................... 705/10
(58) Field of Classification Search ................ 705/10
See application file for complete search history.

(56) References Cited

U.S. PATENT DOCUMENTS

| | | | | |
|---|---|---|---|---|
| 5,743,525 | A * | 4/1998 | Haddad ..................... | 273/139 |
| 6,236,900 | B1 * | 5/2001 | Geiger ....................... | 700/91 |
| 6,353,816 | B1 * | 3/2002 | Tsukimoto .................. | 706/17 |
| 6,473,084 | B1 * | 10/2002 | Phillips et al. ............. | 345/440 |
| 6,505,174 | B1 * | 1/2003 | Keiser et al. .............. | 705/36 R |
| 6,606,615 | B1 * | 8/2003 | Jennings et al. ............ | 706/45 |
| 7,155,510 | B1 * | 12/2006 | Kaplan ..................... | 709/224 |

FOREIGN PATENT DOCUMENTS

KR   WO 01/86532 A1 * 11/2001

OTHER PUBLICATIONS

Archived version of www.fantasystockmarket.com, Mar. 2000.*
Archived version of fantasystockmarket.com, Mar. 2000.*
Clyman, Dana. "Unreasonable Rationality?" Management Science, 1995, [retrieved from JSTOR].*
Gersch et al. "Automatic Classification of Electroencephalograms: Kullback-Leibler Nearest Neighbor Rules," Science, 1979 [retrieved from JSTOR].*
Hammond, "History as a Widespread Externality in Some Arrow-Debreu Market Games," 1995 [retrieved from google.com].*
Fowler, David et al., A Bias-Correctiong Procedure for Beta Estimation in The Presence of Thin Trading The Journal of Financial Research, vol. 7, No. 1, Spring 1989.*
Hanson, Robin, Idea Futures: Encouraging an Honest Consensus Extropy, Vo. 3, No. 2, Winter 1992.*

(Continued)

Primary Examiner—Scott L Jarrett

(57) ABSTRACT

The present invention is a novel methodology for predicting future outcomes that uses small numbers of individuals participating in an imperfect information market. Determining their individual characteristics and performing a nonlinear aggregation of their predictions, provides a probability assessment of the future outcome of an uncertain event. In one embodiment of the present invention the aggregated prediction is compared to both the objective probability of its occurrence and the performance of the market as a whole. In one embodiment, the present invention includes a forecasting process comprising, running an information market, extracting participant characteristics, performing a query process, and aggregating the participant characteristics and results of the query process. The information market is designed to elicit characteristics of the participants include participant risk inclination and ability to analyze information provided in the information market.

12 Claims, 5 Drawing Sheets

OTHER PUBLICATIONS

Myung, In Jae et al., Maximum Entropy Aggregation of Expert Predictions Management Science, Oct. 1996, vol. 42, No. 10.*

Ortner, Gerhard, Forecasting Markets—An Industrial Application Jul. 1997.*

Hanson, Robin, Decision markets IEEE vol. 4 No. 4, May/Jun. 1999.*

Julien, Bruno et al., Estimating Preferences Under Risk: The Case of Racetrack Bettors The Journal of Political Economy, vol. 108, No. 3, Jun. 2000.*

Major, Raymond L. et al., Aggregating expert predictions in a networked environment Computers & Operations Research, Vo. 28, 2001.*

Chen, Kay-Yut et al., Forecasting Uncertain Events with Small Groups HP Laboratories, Jun. 25, 2001.*

Forsythe, Robert et al., Anatomy of an Epxerimental Political Stock Market The American Economic Review, vol. 82, No. 5, Dec. 1992.*

Camerer, Colin F., Do Biases in Probability Judgement Matter in Markets? Experimental Evidence The American Economic Review, vol. 77, No. 5, Dec. 1987.*

Pennock, David M. et al., Extracting Collective Probabilistics Forecasts from Web Games ACM, KDD'01, Aug. 2001.*

Sunder, Shyam, Market for Information: Experimental Evidence Econometrics, vol. 60, No. 3, May 1992.*

Pennock, David M. et al., The Power of Play: Efficiency and Forecast Accuracy in Web Market Games NCR Research Institute, Technical Report 2000-168, Feb. 17, 2001.*

Jackwerth, JC, Recovering risk aversion from option prices and realzied returns The Review of Financial Studues, vol. 13, No. 2, Summer 2000.*

Wolf, Charles et al., The Recovery of Risk Preferences from Actual Choices Econometrica, vol. 51, No. 3, May 1983.*

Clyman, Dana R., Unreasonable Rationality? Management Science, vol. 41, No. 9, Sep. 1995.*

Prediction Market Definition Retrieved from Wikipedia.org Oct. 30, 2008.*

Arrow-Debreu Model Definition Retrieved from Wikipedia.org Oct. 30, 2008.*

Forsythe, Robert et al., Aggregation in an Experimental Market Econometrica, Mar. 1990, vol. 58, No. 2.*

* cited by examiner

Payoff Chart

| Number of Tickets | Possible Payoff | Number of Tickets | Possible Payoff |
|---|---|---|---|
| 1 | 33 | 50 | 854 |
| 10 | 516 | 60 | 893 |
| 20 | 662 | 70 | 925 |
| 30 | 747 | 80 | 953 |
| 40 | 808 | 90 | 978 |

FIG 4

SYSTEM AND METHOD FOR FORECASTING UNCERTAIN EVENTS WITH ADJUSTMENTS FOR PARTICIPANTS CHARACTERISTICS

FIELD OF THE INVENTION

The present invention relates generally to forecasting events. More particularly, the present invention relates to a method and system for efficiently utilizing small groups to forecast uncertain events.

BACKGROUND OF THE INVENTION

Accurately predicting future outcomes associated with uncertain situations offers the potential to achieve advantageous results in a number of applications. A variety of individuals and organizations utilize the prediction of future outcomes to provide guidance in the study of regularities that underlie natural and social phenomena. In the physical and biological sciences the discovery of strong laws has enabled the prediction of future scenarios with uncanny accuracy. However, traditional attempts at predicting future outcomes are typically less accurate in other areas such as the social sciences and tend to be adversely impacted by a variety of participant characteristics such as risk tendencies and ability to analyze relevant information.

Analyzing collective input from a variety of individuals typically provides greater accuracy in predicting future outcomes. Relying on a single individual to predict a future outcome is usually very precarious. Collective input enables the abilities of a variety of individuals to be leverage and detrimental impacts associated with the frailties of any single participant to be mitigated. However, it is very inconvenient and expensive to gather and analyze predictive inputs from large numbers of participants, frequently dispersed across vast geographical areas. Prediction activities such as the dissemination of information relevant to forecasts and collection of future predictions are typically more difficult in large groups. Activities such as controlling information dissemination and gathering predictions from a small group of individuals is relatively inexpensive and easy. Nevertheless, the collective predictive accuracy of small groups is susceptible to a variety of potential adverse characteristics that impact the collection and analysis of information related to an uncertain situation.

The availability and analysis of information related to an uncertain situation typically has a significant impact on the accuracy of a future outcome prediction. The greater availability of information related to the uncertain situation, the more accurate predictions tend to be. In the business arena, economists have long articulated the belief that markets efficiently collect and disseminate information. In particular, rational expectations theory indicates that markets have the capacity to aggregate information held by individuals and also to convey expectations associated with the information via the price and volume of assets. Therefore, a market where the asset is information rather than a physical good has the potential to provide some guidance on the prediction of future outcomes.

Information markets generally involve the trading of state-contingent securities. If these markets are large enough and properly designed, they can provide more accurate than other techniques for extracting diffuse information, such as surveys and opinions polls. However, information markets tend to suffer from a variety of problems such as information traps, illiquidity, manipulation, and lack of equilibrium. These problems are exacerbated when the groups involved are small (e.g., less than 30 participants) and not very experienced at playing in an information market. Traditional attempts might seem to aggregate dispersed information well, but they are typically very expensive, fragile, context-specific and offer little or no improvement.

To complicate matters further, business and social information relevant to predictions involve people with personal characteristics that tend to skew results, making it hard to identify and accurately aggregate forecasts or predictions. There are a number of characteristics that impact individual reporting, such as risk tendencies and ability to analyze the information. Individuals that are relatively proficient at assimilating and analyzing available information have a tendency to provide better predictions of future outcomes than those that are less proficient at assimilating and analyzing available information. Even when individuals are relatively proficient at assimilating and analyzing available information their personal approach to risk conditions impact their prediction of future outcomes.

Risk attitudes cause most individuals to not necessarily report their true posterior probabilities conditioned solely on the information related to a prediction of an uncertain outcome. In most realistic situations, risk averse persons report a probability distribution that is flatter than their true beliefs as they to spread their bets among all possible outcomes. In the extreme case of risk aversion, individuals report a flat probability distribution regardless of available information. In this case, no predictive information is revealed by the reported prediction. Conversely, risk-loving individuals tend to report a probability distribution that is more sharply peaked around a particular prediction, and in the extreme case of risk loving behavior their optimal response is to put all the weight on the most probable state according to their observations. In this case, their report conveys some, but not all the information contained in their observations.

What is required is a system and method to forecast uncertain events with small groups. The system and method should accurately aggregate information with correct incentives.

SUMMARY OF THE INVENTION

The present invention is a novel methodology for predicting future outcomes that uses small numbers of individuals participating in an imperfect information market. A present invention forecasting method provides a probability assessment of a future outcome associated with an uncertain event by determining the individual characteristics of participants and performing an adjusted aggregation of their predictions. In one embodiment, the present invention includes a forecasting process in which an information market is run, participant characteristics are extracted, a query process is performed, and the participant predictions with adjustments for the participant characteristics are aggregated. The information market is designed to elicit characteristics of the participants including participant risk inclination and ability to analyze information provided in the information market. In one embodiment of the present invention, the aggregated prediction is based upon a nonlinear aggregation of individual participant predictions with exponential adjustment for characteristics of the individual participants and the information market as a whole.

BRIEF DESCRIPTION OF THE DRAWINGS

The present invention is illustrated by way of example and not by way of limitation, in the Figures of the accompanying drawings and in which like reference numerals refer to similar elements and in which:

FIG. 4 is an illustration of an excerpt from one exemplary payoff chart for a reporting game utilized in a present invention information market.

DETAILED DESCRIPTION OF THE INVENTION

Reference will now be made in detail to the embodiments of the invention, a system and method for forecasting uncertain events with small groups, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Figure 1:
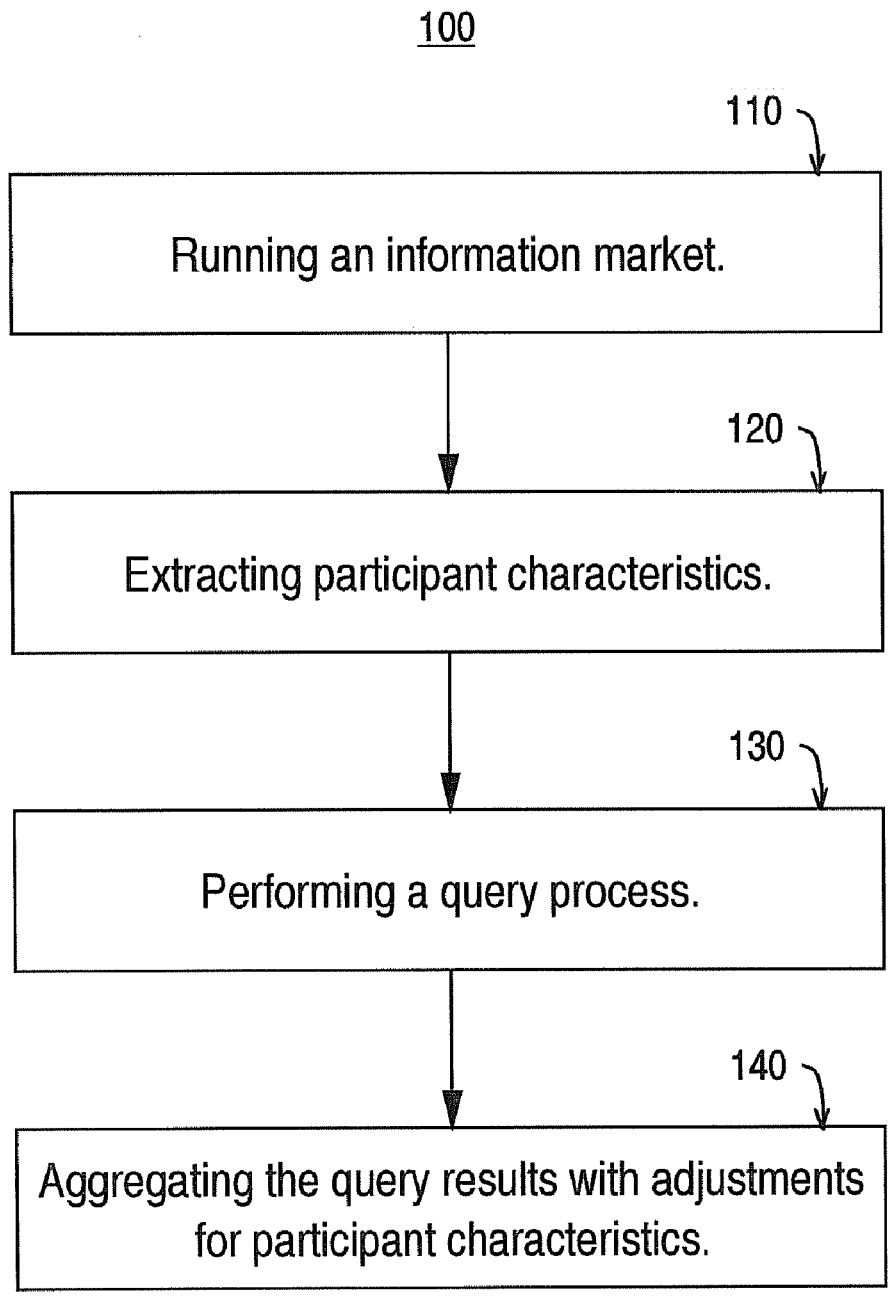
FIG. 1 is a flow chart of an uncertain event forecasting process, one embodiment of the present invention.

FIG. 1 is a flow chart of forecasting method 100, one embodiment of the present invention. Forecasting method 100 is a novel methodology for predicting future outcomes of uncertain events. In one embodiment of the present invention, uncertain event forecasting method 100 is a multi-stage event in which a small number of individuals (e.g., less than 30) participate in an imperfect information market. The probability of a future uncertain event outcome is assessed by analyzing the personal characteristics of participants and performing an aggregation (e.g., nonlinear aggregation) of their predictions. In one embodiment of the present invention, the ability of participants to analyze information and their risk attitudes are factored into the aggregation.

In step 110, an information market is run. The information market is designed to elicit characteristics of participants (e.g., individual risk attitudes, information analysis abilities, relevant behavioral information, access to information, etc.). In one embodiment of the present invention, running an information market includes the creation of an artificial market in which financial instruments are utilized. The financial instruments correspond to a future real world event or state. The financial instrument is traded (e.g., bought and sold) in the information market and if the real world state or event occurs the financial instrument pays off. Even when a participant pool may be too small for an information market to act perfectly efficiently, a properly designed information market (as described in the present invention) is a powerful enough mechanism to elicit the desired characteristics information.

Participant characteristics are extracted in step 120. The results obtained in step 110 are analyzed to extract characteristics of the participants. In one embodiment of the present invention, the extracted characteristics of the participants include risk attitudes and ability to interpret information. In one embodiment of the present invention, the participant characteristics are extracted by correlating observed behavior to accepted characteristic tendencies. Participants that are risk inclined tend to concentrate a significant amount of their resources on fewer possible outcomes with the promise of a greater payoff and risk adverse individuals are more likely to place their resources over diverse possible outcomes with the possibility of smaller payoffs. In one embodiment of the present invention, different scenarios are utilized in which participants are presented with different information and their ability to identify and respond to the quality of the information (e.g., good, correct, relevant information etc. versus bad, incorrect, irrelevant information etc.) is extracted.

In step 130, a predictive query process is performed. A predictive query process includes posing a query to the information market participants and gathering the responses. The query can be about a subject related to the information market run in step 100 or an unrelated subject. In one embodiment of the present invention, the query asks the participants to predict a future outcome associated with an uncertain situation (e.g., provide a predictive probability of a future outcome occurrence). In one embodiment of the present invention, participants are asked to "vote" (indicate their belief) on the probability of an outcome by assigning limited resources (e.g., money, financial instrument, a ticket, a chip, etc.) to a potential outcome. The present invention is readily adaptable to a variety of different predictive indication or "voting" configurations and mechanisms. For example, the participants could be limited to "voting" for one potential outcome in one embodiment and allowed to "vote" for a plurality of potential states in another embodiment. In one exemplary implementation of the present invention, participants are asked to trade a financial instrument (e.g., similar to a financial instrument utilized in step 110) that corresponds to a potential future real world event or state. For example, in an embodiment in which participants "vote" by assigning money to their prediction, participants may assign some of money (e.g., 25 dollars) to one potential state and the same or different value of money (e.g., 75 dollars) to another potential state. To ensure participants are properly motivated they receive financial rewards if their predictions ("votes") are accurate (the predicted outcome occurs).

In step 140, the query responses with adjustments for participant characteristics are aggregated. In one embodiment of the present invention, the aggregation accumulates the "votes" of the participants provided in step 130 with adjustments for the participants' characteristics information extracted in step 120. In one exemplary implementation, the aggregation function accounts for both diverse levels of risk aversion and information analysis strengths. For example, the probability projections of the participants are aggregated after adjustments for risk tendencies and information analysis capabilities.

In one embodiment of the present invention, the aggregation function to determine the probability of an outcome s, conditioned on observed information I, is given by:

$$P(s \mid I) = \frac{p_{s_1}^{\beta_1} p_{s_2}^{\beta_2} \ldots p_{s_N}^{\beta_N}}{\sum_{\forall s} p_{s_1}^{\beta_1} p_{s_2}^{\beta_2} \ldots p_{s_N}^{\beta_N}}$$

where $p_{si}$ is the probability that individual i (i=1 ... N) assigns to outcome s. The exponent $\beta_i$ is assigned to adjust for the characteristics of individual i and facilitates recovery of the true posterior probabilities from individual i's report. This is based upon the N individuals observing independent information about the likelihood of a given state, reporting the probability of a given state, and conditioning the observations of the individuals by multiplying reported probabilities with adjustments for individual characteristics and normalizing the results.

In one embodiment of the present invention, the value of $\beta$ is impacted by the risk characteristics of the individual participant and the market as a whole. In one exemplary implementation of the present invention, the value of $\beta$ for a risk neutral individual is one as this individual is believed to report the true perceived probabilities associated with information exposed to a risk neutral individual. For a risk averse individual, $\beta_i$ is greater than one and compensate for the flat distribution that a risk adverse individual is believed to report. The reverse, namely $\beta_i$ smaller than one, applies to risk loving individuals and compensate for the "peaked" distribution that a risk inclined individual is believed to report. In terms of both the market performance, individual holdings and risk behavior, a simple functional form for $\beta_i$ is given in one example by:

$$\beta_i = r(V_i/\sigma_i)c$$

where r is a parameter that captures the risk attitude of the whole market (e.g., as reflected in the market prices of the assets), $V_i$ is the utility of individual i, and $\sigma_i$ is the variance of his holdings over time. The variable c is utilized as a normalization factor so that if r=1, $\beta_i$ equals the number of individuals. Thus, values for $\beta_i$ relies upon the determination of both the risk attitudes of the market as a whole and of the individual players.

In one embodiment of a present invention information market, the ratio of the winning payoff to the sum of the prices provides a proxy for the risk attitude of the market as a whole. Utilizing the ratio of the winning payoff to the sum of the prices is based upon relationships of market characteristics and anticipated payoffs. If the market is perfectly efficient then the sum of the prices of the securities should be exactly equal to the payoff of the winning security. However, in thin markets characterized by some implementations of the present invention, a perfect efficiency condition is rarely met. Moreover, although prices that do not sum to the winning payoff indicate an arbitrage opportunity, it is rarely possible to realize this opportunity with a portfolio purchase (once again, due to the thinness of the market). Nevertheless, one exemplary implementation of the present invention utilizes these facts to provide significant advantageous insight. If the sum of the prices is below the winning payoff, then it can be inferred that the market is risk-averse, while if the price is above this payoff then it can be inferred the market exhibits risk-loving behavior. Thus, in one exemplary implementation a relationship between the winning payoff to the sum of the prices is utilized as an indication of the risk attitude of the market as a whole In one embodiment of the present invention, the characteristics of the individual players are determined and examined. In one exemplary implementation, the ratio of value to risk, $(V_i/\sigma_i)$, captures risk attitudes and predictive power (e.g., ability to analyze information) of an individual. An individual's value $V_i$ is given by the market prices multiplied by the individual's holdings, summed over the securities. Relying upon accepted principles of portfolio theory, the individual's propensity for risk can be measured by the variance of the individual's values using normalized market prices as probabilities of the possible outcomes.

In one embodiment of the present invention forecasting method 100 is implemented on a computer system. The computer system comprises a memory for storing instructions on implementing forecasting method 100 coupled to a bus for communicating the instructions to a processor that executes the instructions. In one exemplary implementation, participants enter their input into the processor which performs extractions of their characteristics and aggregation of their predictions with adjustments for their characteristics. In one exemplary implementation of the present invention, the computer system is coupled to the a communication network (e.g., the Internet) and the present invention forecasting method is implemented via the network with participants interacting the with computer system from distributed resources.

Figure 2:
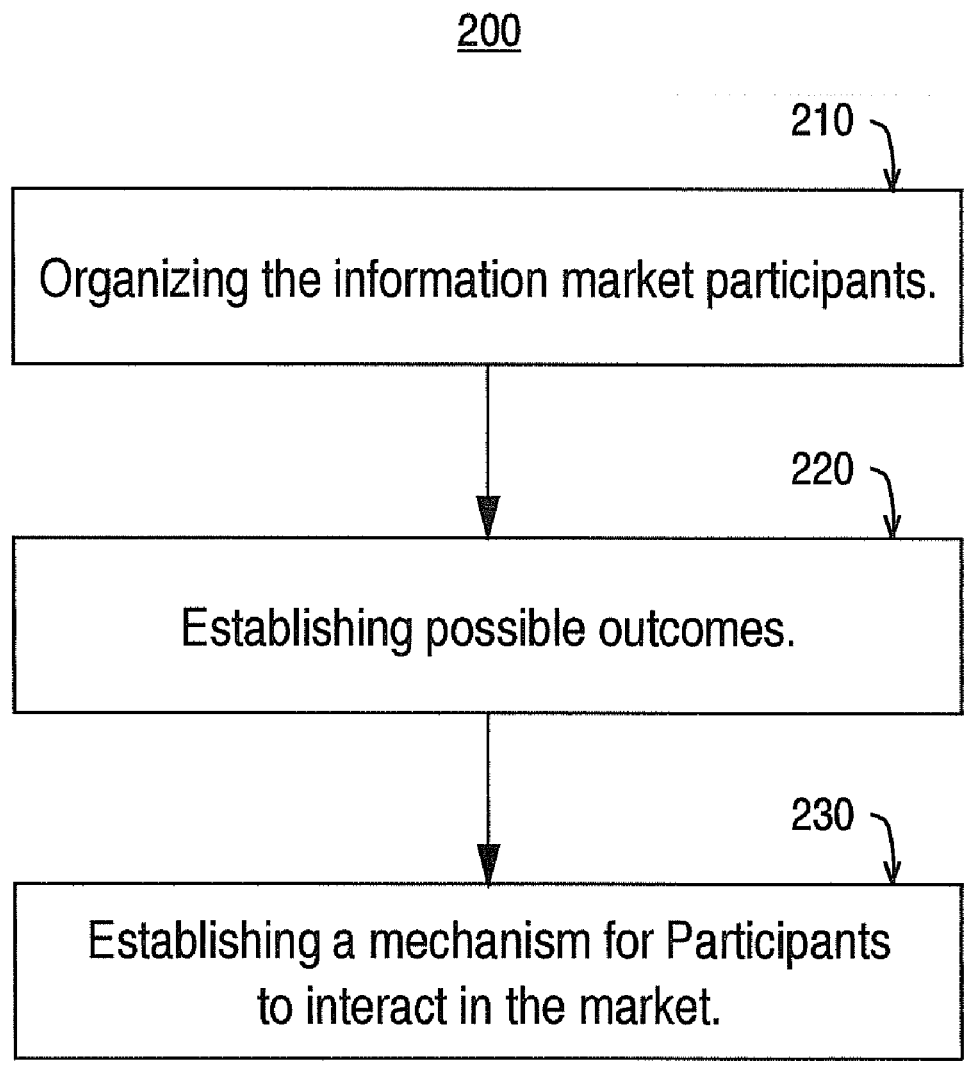
FIG. 2 is a flow chart of one embodiment of running an information market in a present invention forecasting.

FIG. 2 is a flow chart of one embodiment of running an information market. In one embodiment of the present invention the information market is driven by the same information structure as the query reporting structure (e.g., step 130). In one exemplary implementation of the present invention several information market sessions are run (e.g., five).

In step 210 the participants are organized. In one exemplary implementation of the present invention, a number of individuals are isolated and divided into small groups (e.g., eight to thirteen individuals in each group). The subjects are provided instructions and training for the information market sessions. In one embodiment, the information market includes a multi-stage mechanism.

In step 220 a financial instrument is created. In one embodiment of the present invention the possible outcomes are referred to as "states". In one exemplary implementation, artificial financial instruments are created that correspond to a potential state (e.g., a real life activity or event such as trading on the stocks). A first financial instrument corresponds to a first state in the real life activity (e.g., an increase in the Dow Jones index). A second financial instrument corresponds to a second state in the real life activity (e.g., Dow Jones index remaining flat). A third financial instrument corresponds to a third state in the real life activity (e.g., decrease in the Dow Jones index).

In one exemplary embodiment, each financial instrument has an Arrow-Debreu state associated with it in which the states have lottery like properties which pay off a reward (e.g., money, one unit, etc.) contingent on the positive outcome of an event or occurrence of a state linked to a particular financial instrument and a zero payoff otherwise (e.g., for events or states linked to other financial instruments). If the first state occurs (e.g., Dow Jones index increases) the first financial instrument payoff a reward and the second and third financial instruments payoff nothing. If the second state occurs (e.g., Dow Jones remains flat) the second financial instrument payoff a reward and the first and third financial instruments payoff nothing. If the third state occurs (e.g., Dow Jones decreases) the third financial instrument payoff a reward and the first and second financial instruments payoff nothing.

In step 230 a mechanism for permitting the participants to interact (e.g., "vote") in the information market is established. In the present embodiment, the constructed information market comprises an artificial call market in which financial instruments (e.g., artificial securities) are traded and participants "vote" by buying and selling the financial instruments. Participants interact with the market ("vote") by assigning a currency to a security associated with a particular state. For example, if a state occurs, the associated financial instrument or state security pays off at a value of 1,000 francs. In one exemplary implementation the theoretical expected value of any given security, a priori, is ascertainable (e.g., 100 francs). Subjects are provided with some securities and currency at the beginning of each period. The amount of securities and currency provided to each participant is varied (e.g., over time) in one embodiment to enable extraction of behavior under differing circumstances and thereby obtain a more precise understanding of a participant's characteristics.

In one embodiment of the present invention, multiple information market sessions are run. Each session includes periods comprising multiple rounds (e.g., six), lasting a predetermined time (e.g., 90 seconds each). At the end of each round, the bids and asks are gathered and a market price and volume are determined. The transactions are then completed and another call round begun. At the end of six trading rounds the period is over, the true state security revealed, and subjects paid according to the holdings of that security. This procedure is then repeated in the next period, with no correlation between the states drawn in each period.

In one embodiment of the present invention, the information market is run in stages. In one exemplary implementation there are alterations introduced in different stages. For example in one stage, subjects play under the same information structure (e.g., same real world activity such as tracking the Dow Jones Index) as in another stage, although the true states are independent from those in the other stage. Each period the subjects receive a predetermined amount of resources (e.g., 100 tickets) and the results of the real world state for that period is tracked. The participants are asked to distribute the resources across the potential states with the constraint that all the resources be spent each period and that at least some resource (e.g., one ticket) is spent on each state. Since the fraction of tickets spent determines $p_{si}$, this implies that $p_{si}$ is never zero.

The subjects are given a chart that informs them how many francs they earn upon the realization of the true state as a function of the number of tickets spent on the true state security. The payoff is a linear function of the log of the percentage of tickets placed in the winning state. FIG. 4 is an illustration of an excerpt from one exemplary payoff chart utilized in an information market. The chart the participants receive showed the payoff for every possible ticket expenditure.

In one embodiment of the present invention, the speed of the trading sessions in the information market are varied. In one exemplary implementation, the speed of the session depends on how fast the subjects are making their decisions, the length of the training sessions and a number of other variables. Therefore, a different number of periods are completed in different sessions.

Figure 3:
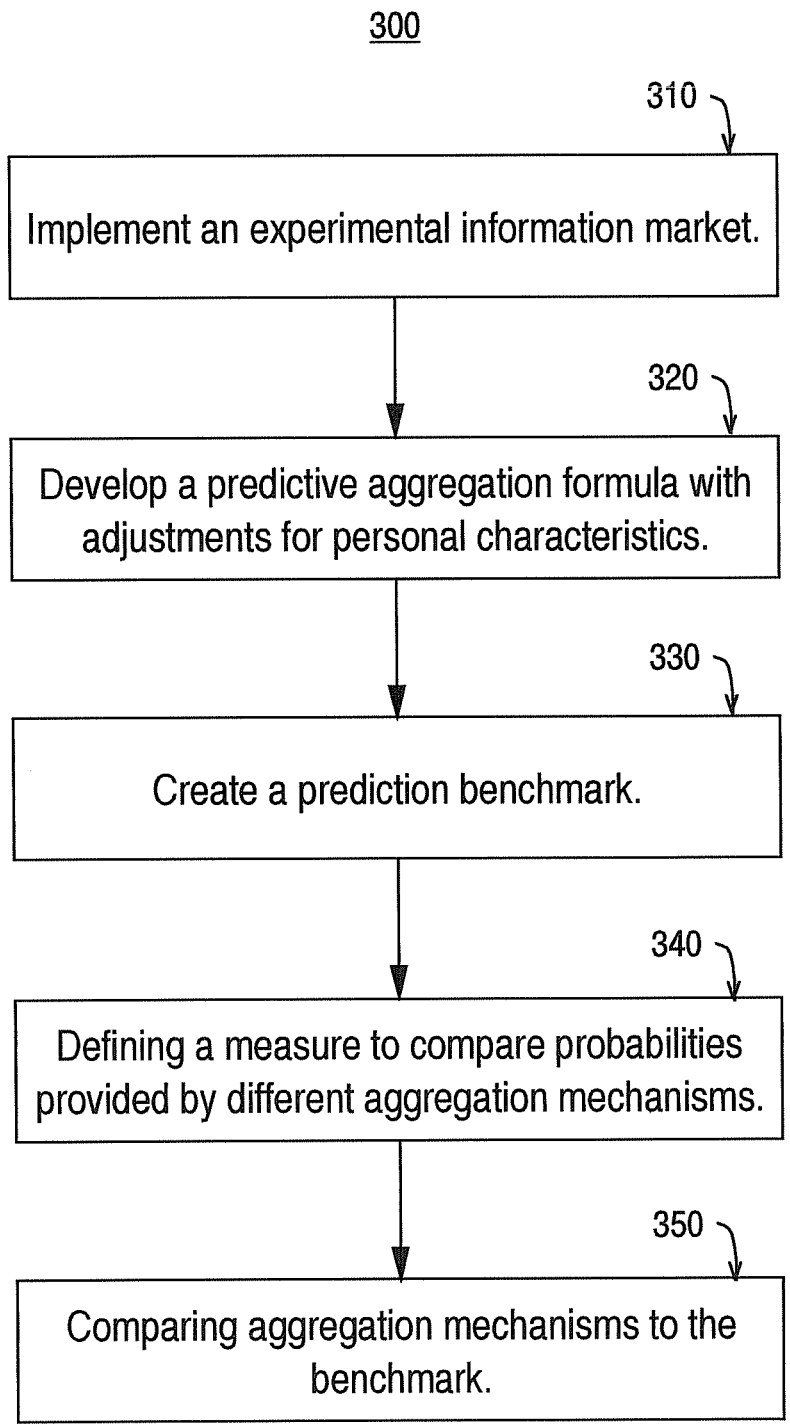
FIG. 3 is a flow chart of an aggregation function analysis, one embodiment of a present invention analysis of different aggregation functions.

It is important to note that the present invention is adaptable to numerous environments utilizing a variety of aggregation formulas. Sometimes a "new" environment that has not been modeled before is modeled under laboratory conditions. In one embodiment of the present invention, when dealing with a "new" environment an analysis of different aggregation functions is performed. The analysis of different aggregation functions compares a "new" aggregation function to a benchmark and ensures the aggregation function is providing beneficial information. FIG. 3 is a flow chart of a new environment aggregation function analysis 300 one embodiment of a present invention analysis of different aggregation functions. In one embodiment of the present invention, after a new environment analysis on a particular aggregation formula that includes adjustments for the characteristics of the participants (e.g., a modified Bayes formula or other aggregation approach) is performed and the aggregation formula is an acceptable predictor of future states, the aggregation formula is utilized in a present invention forecasting method (e.g., forecasting method 100).

In step 310 an experimental information market is implemented in an laboratory environment. The experimental information market includes artificial financial instruments correlated to laboratory events. In one embodiment of the present invention, the laboratory events are relatively limited in potential outcomes (e.g., the selection of one particular colored ball from a limited number of different colored balls in an urn). The potential laboratory events are also relatively susceptible to control by predetermined influences on the probability of an outcome (e.g., placing more balls of a particular color than other colors in the urn). The additional control facilitates greater analysis of participants characteristics.

A predictive aggregation formula with adjustments for personal characteristics is developed in step 320. In one embodiment of the present invention a theoretical predictive aggregation formula (e.g., Bayes' formula) is altered to include adjustments for the personal characteristics of the participants. The adjustments are based upon participants experimental characteristics extracted from the results of running the information market in step 310.

In step 330 a prediction benchmark is created. If the aggregation mechanism were perfect, the probability distribution of the states would be as if one person had seen all of the information available to the community. Therefore, the probability distribution conditioned on all the information acts as a benchmark for comparisons made to alternative aggregation mechanisms. In one embodiment of the present invention, the experimental information market includes twelve balls in an information urn, three for the true state and one for each of nine other states. Using Bayes' rule one obtains the omniscient theoretical probability distribution:

$$p(s \mid O) = \frac{\left(\frac{3}{12}\right)^{\#(s)} \left(\frac{1}{12}\right)^{\#(^s)}}{\sum_{\forall s} \left(\frac{3}{12}\right)^{\#(s)} \left(\frac{1}{12}\right)^{\#(^s)}}$$

where s denotes the states, O is a string of observations, #(s) is the number of draws of the state s in the string, and #($^s$) is the number of draws of all other states.

In step 340 a measure to compare probabilities provided by different aggregation mechanisms to the benchmark is defined. One exemplary measure is the Kullback-Leibler measure, also known as the relative entropy measure. The Kullback-Leibler measure of two probability distributions p and q is given by:

$$KL(p, q) = E_p\left(\log\left(\frac{p}{q}\right)\right)$$

where p is the "true" distribution. In the case of finite number of discrete states, the above equation can be rewritten as:

$$KL(p, q) = \sum_s p_s \log\left(\frac{p_s}{q_s}\right)$$

It can be shown that KL(p,q)=0 if and only if the distribution p and q are identical, and that KL(p,q)≧0. A smaller Kullback-Leibler number indicates that two probabilities are closer to each other. Furthermore, the Kullback-Leibler measure of the joint distribution of multiple independent events is the sum of the Kullback-Leibler measures of the individual events. Since periods within the present exemplary information market are independent events, the sum or average (across periods) of Kullback-Leibler measures is a good summary statistics of the whole information market process.

In step 350, aggregation mechanisms are compared to the bench mark. In one embodiment of the present invention, three information aggregation mechanisms are compared to the benchmark distribution given by finite equation above by using the Kullback-Leibler measure. In addition, reports are made of the Kullback-Leibler measures, of the "no information" prediction (uniform distribution over all possible states) and the predictions of the best individual. The "no information" prediction serves as the first baseline to determine if any information is contained in the predictions of the mechanisms. If a mechanism is really aggregating information, then it should be doing at least as well as the best individual. Predictions of the best individual serve as the second baseline, which helps to determine if information aggregation indeed occurred in the information market.

The first of the three information aggregation mechanisms is the market prediction. The market prediction was calculated using the last traded prices of the assets. The last traded prices are utilized rather than the current round's price because sometimes there was no trade in a given asset in a given round. A probability distribution on the states is inferred from these prices. The second and the third mechanisms are a simple aggregation function given by the risk neutral formula (e.g., using Bayes rule) and a market-based nonlinear aggregation function (e.g., discussed above). Exemplary results from one embodiment of the present invention are show in the following table.

ited a smaller standard deviation than the market prediction, which indicates that the quality of its predictions, as measured by the Kullback-Leibler number, is more consistent than that of the market. In three of five cases, it also offered substantial improvements over the simple aggregation function.

The results displayed in the second column show that the market was not sufficiently liquid to aggregate information properly, and it was only marginally better than the a priori no information case. In mast cases the best player in the reporting game conveyed more information about the probability distribution than the market did. However, even in situations where the market performs quite poorly, it does provide some information, enough to help construct an aggregation function with appropriate exponents.

Figure 5:
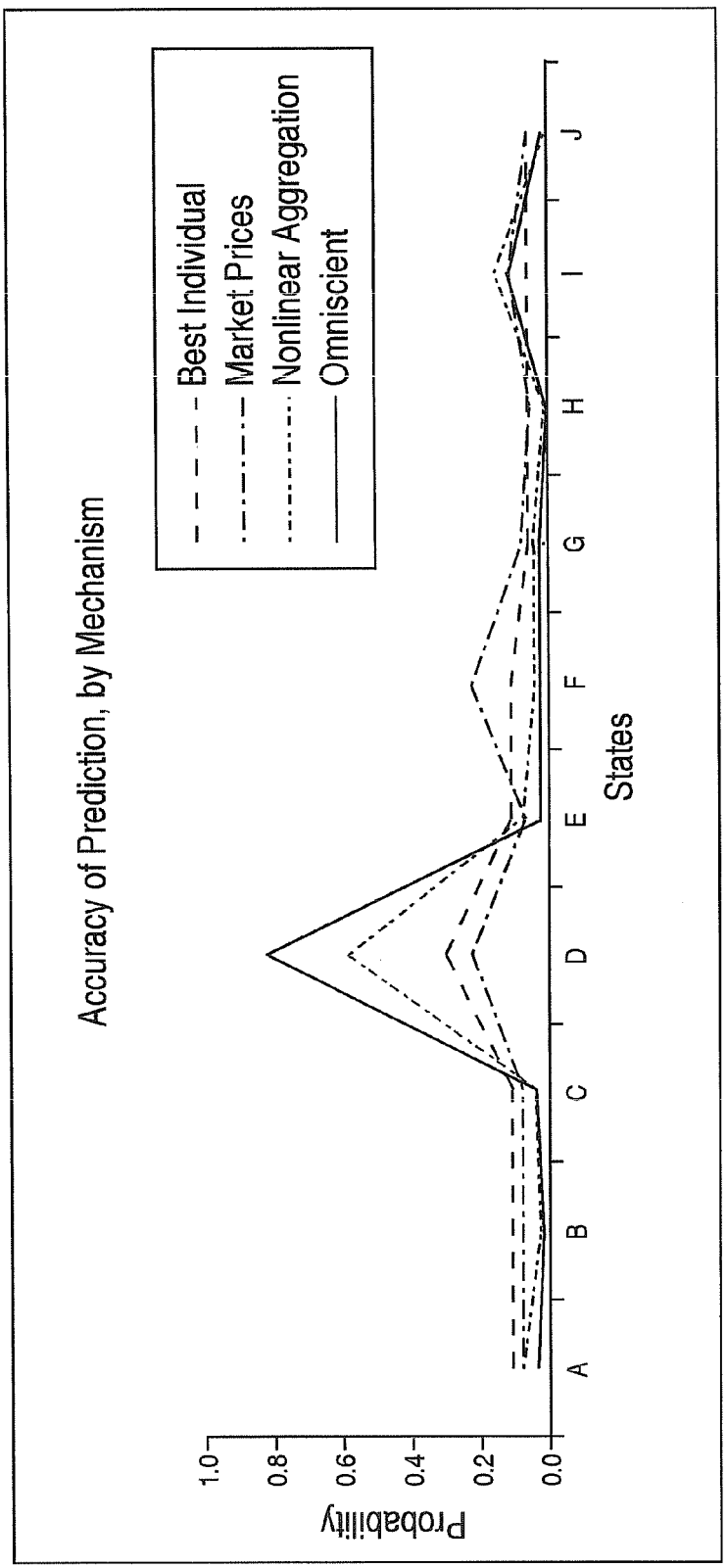
FIG. 5 is a graphical illustration of the results showing the probability distributions generated by the market mechanisms, the best individual in a typical experiment, the nonlinear aggregation function, as well as the omniscient probability distribution generated by omniscient probability distribution equation

FIG. 5 is a graphical illustration of the results showing the probability distributions generated by the market mechanisms, the best individual in a typical experiment, the nonlinear aggregation function, as well as the omniscient probability distribution generated by omniscient probability distribution equation. The nonlinear aggregation function exhibits a functional form very similar to the omniscient probability, and with low variance compared to the other mechanisms. This is contrasted with the market prediction, which exhibits an information trap at state F and a much larger variance. These results confirm the utility of the present invention nonlinear aggregation mechanism for making good forecasts of uncertain outcomes.

It is appreciated that the present invention is adaptable to a variety of implementations. For example, the present invention is particularly useful in a typical business forecast cycle. Since forecast cycles in organizations typically involve the prediction of similar events on a periodic basis, it is possible to set up an initial market to obtain consistent measures of participant characteristics (e.g., abilities and risk attitudes) and then use the reporting mechanism to extract and aggregate information in the future. This approach can be extended to work across organizations. For example, aggregation and creation of consensus in the financial analysts community, to provide the venture capital community a way of forming predictions about the viability of new ventures, predict movie ticket sales (e.g., create forecasts before a movie is released), and running focus groups where each member has a financial stake in the information coming out of the focus group.

| No Information | Market Prediction | Best Player | Simple Aggregation Function | Nonlinear Aggregation Function |
|---|---|---|---|---|
| 1.977 (0.312) | 1.222 (0.650) | 0.844 (0.599) | 1.105 (2.331) | 0.553 (1.057) |
| 1.501 (0.618) | 1.112 (0.594) | 1.128 (0.389) | 0.207 (0.215) | 0.214 (0.195) |
| 1.689 (0.576) | 1.053 (1.083) | 0.876 (0.646) | 0.489 (0.754) | 0.414 (0.404) |
| 1.635 (0.570) | 1.136 (0.193) | 1.074 (0.462) | 0.253 (0.325) | 0.413 (0.260) |
| 1.640 (0.598) | 1.371 (0.661) | 1.164 (0.944) | 0.478 (0.568) | 0.395 (0.407) |

The entries are the average values and standard deviations (in parentheses) of the Kullback-Leibler number, which is used to characterize the difference between the probability distributions coming out of a given mechanism and the omniscient probability. As can easily be seen, in the present exemplary implementation the nonlinear aggregation function worked extremely well. It resulted in significantly lower Kullback-Leibler numbers than the no information case, the market prediction, and the best a single player could do. In fact, it performed almost three times as well as the information market. Furthermore, the nonlinear aggregation function exhib- Although the embodiments described above focused on simplified events with finite number of outcomes and assumptions of independent information in order to avoid obfuscation of the invention, the present invention is readily adaptable to continuous state space and non-independent information structure. The present invention is also readily adaptable to the aggregation information over large geographical areas. In one embodiment in which information markets are run asynchronously adjustments are made for issues associated with information cascades and optimization of market timing.

Thus, the present invention system and method enables efficient and effective forecasting uncertain events with small groups. The system and method facilitates accurate aggregation of information with correct incentives. The present multi-stage forecasting method information market mechanisms permits enables analysis of past predictive performance that leads to the development of weighting schemes for future prediction mechanisms. The adjustments associated with the weighting schemes permits effective predictions of future outcomes by harnessing distributed knowledge in a manner that alleviates problems associated with low levels of participation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A forecasting process comprising:
running multiple sessions of an information market including an artificial market in which financial instruments are utilized, wherein said financial instruments are traded by participants in said information market, wherein said information market is designed to elicit participant characteristics of participants;
extracting said participant characteristics through an analysis of results of trading of said financial instruments by correlating observed behavior to accepted characteristic tendencies, wherein said participant characteristics include participant risk inclination and participant ability to interpret information, wherein said extracting is performed by a computer system;
generating a predictive aggregation formula with adjustments for said participant characteristics, wherein said predictive aggregation formula aggregates predictive information related to said multiple sessions of said information market wherein said adjustments include individual participant predictions with exponential factoring for characteristics of said individual participants and said information market as a whole, wherein said generating a predictive aggregation formula with adjustments for said participant characteristics is performed by said computer system;
performing a predictive query process in subsequent to said running multiple sessions of said information market, said predictive query process including posing a predictive query to said participants and gathering results of said predictive query, said predictive query about a probability of a future outcome occurrence associated with an uncertain situation;
aggregating results of said predictive query process with adjustments for said predictive aggregation formula comprising said participant characteristics to produce an aggregated probability projection associated with said uncertain situation; and
generating a forecast for said uncertain event based on said aggregated probability projection, wherein said generating said forecast for said uncertain event is performed by said computer system.

2. A forecasting process of claim 1 further comprising utilizing different scenarios wherein said participants are presented with different information and wherein said participant characteristics include participant's ability to identify and respond to quality of said information provided in said information market.

3. A forecasting process of claim 1 wherein said information market includes an artificial market financial instrument corresponding to a real world state.

4. A forecasting process of claim 1 wherein the results of the predictive query process are aggregated by revising apriori probabilities with reports provided by participants and conditioning the reports by the characteristics of the participants.

5. A forecasting process of claim 1 wherein the results of the predictive query process are aggregated by utilizing Bayes formula with each probability of said future outcome occurrence assigned by a participant modified by an exponential factor to condition the probability for adjustments associated with each participant's characteristics.

6. A computer system comprising:
a memory for storing instructions on implementing a forecasting method; and
a processor that executes said the instructions on implementing a forecasting method, including:
running multiple sessions of an information market including an artificial market in which financial instruments are utilized, wherein said financial instruments are traded by participants in said information market, wherein said information market is designed to elicit participant characteristics of participants;
extracting said participant characteristics through an analysis of results of trading of said financial instruments by correlating observed behavior to accepted characteristic tendencies, wherein said participant characteristics include participant risk inclination and participant ability to interpret information;
generating a predictive aggregation formula with adjustments for said participant characteristics, wherein said predictive aggregation formula aggregates predictive information related to said multiple sessions of said information market wherein said adjustments include individual participant predictions with exponential factoring for characteristics of said individual participants and said information market as a whole;
performing a predictive query process in subsequent to said running multiple sessions of said information market, said predictive query process including posing a predictive query to said participants and gathering results of said predictive query, said predictive query about a probability of a future outcome occurrence associated with an uncertain situation;
aggregating results of said predictive query process with adjustments for said predictive aggregation formula comprising said participant characteristics to produce an aggregated probability projection associated with said uncertain situation wherein said aggregated probability projection is based upon a nonlinear aggregation of individual participant predictions with exponential adjustment for characteristics of said individual participants and said information market as a whole; and
generating a forecast for said uncertain event based on said aggregated probability projection.

7. A computer system of claim 6 wherein said processor and memory are communicatively coupled to the Internet and participants interact with said forecasting computer system via the Internet.

8. A computer system of claim 6 wherein running said multiple sessions of said information market comprises:
   organizing participants;
   creating a financial instrument; and
   establishing a mechanism for permitting participants to interact in said information market.

9. The computer system of claim 6 wherein possible information market states are associated with an Arrow-Debreu state security.

10. The computer system of claim 6 wherein said information market artificial instruments correspond to the occurrence of a real world state.

11. The computer system of claim 8 wherein said information market comprises an artificial call market in which securities are traded.

12. The computer system of claim 11 wherein running said multiple sessions of said information market further comprises:
   gathering the bids and asks at the end of a call round;
   determining a market price and volume;
   completing transactions; and
   beginning another call round.

* * * * *